Oct. 29, 1935.  J. LITHGOW ET AL  2,019,472
THERMOSTATIC CONTROL
Filed March 21, 1934  3 Sheets-Sheet 1
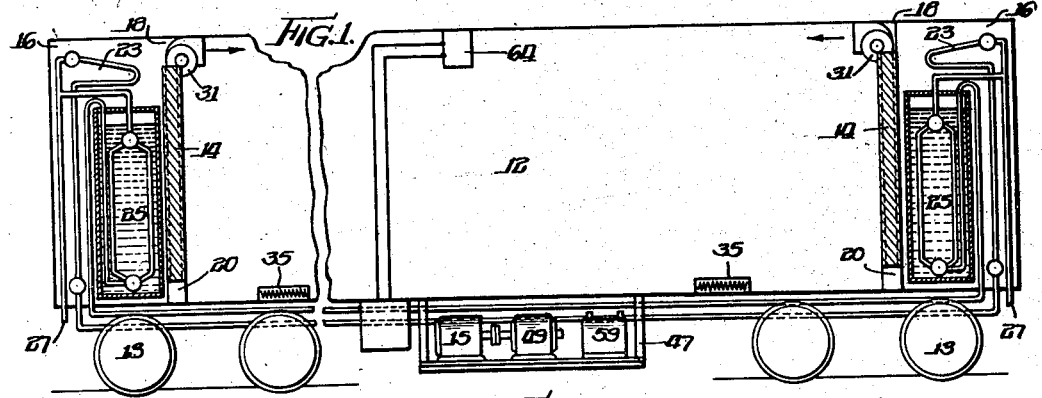
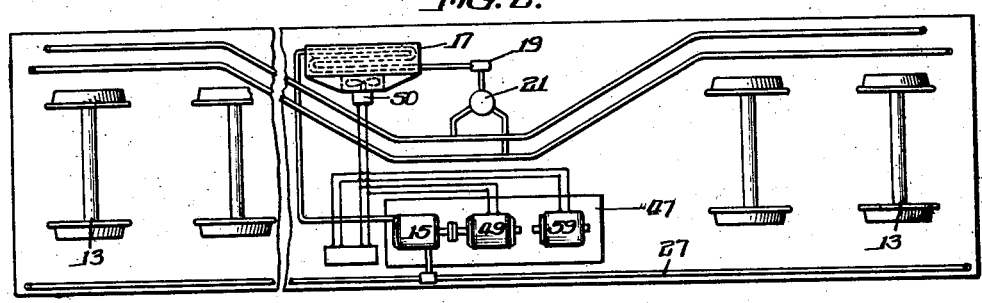
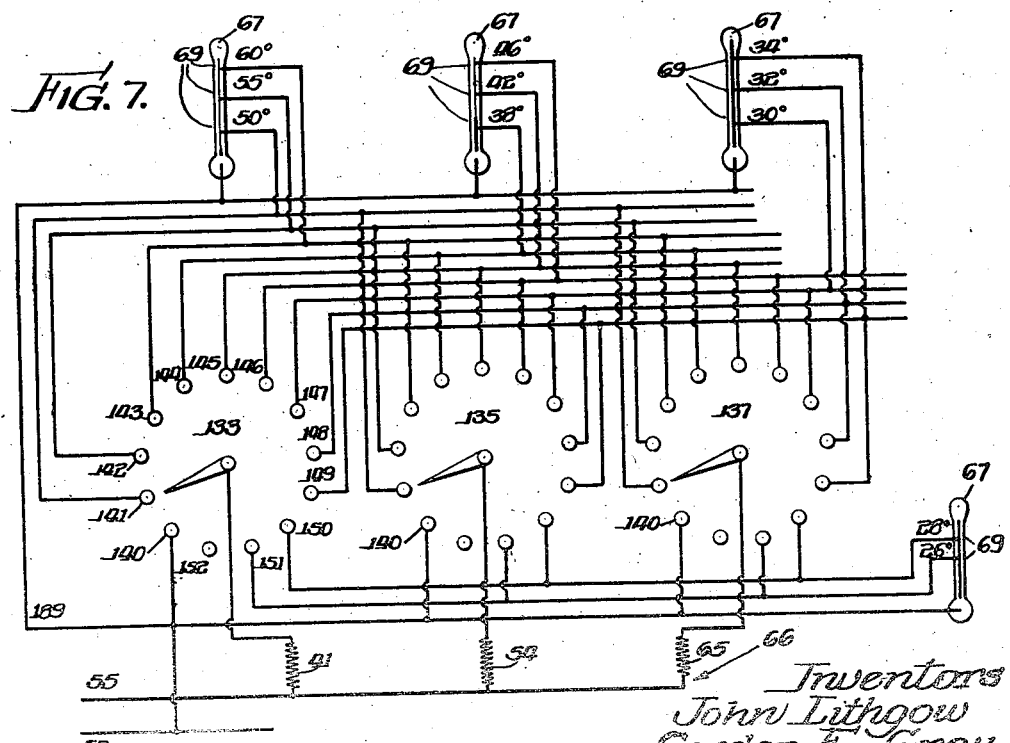
Inventors
John Lithgow
Gordon E. Gray
By: Cox & Moon
atty Oct. 29, 1935.  J. LITHGOW ET AL  2,019,472
THERMOSTATIC CONTROL
Filed March 21, 1934  3 Sheets-Sheet 2
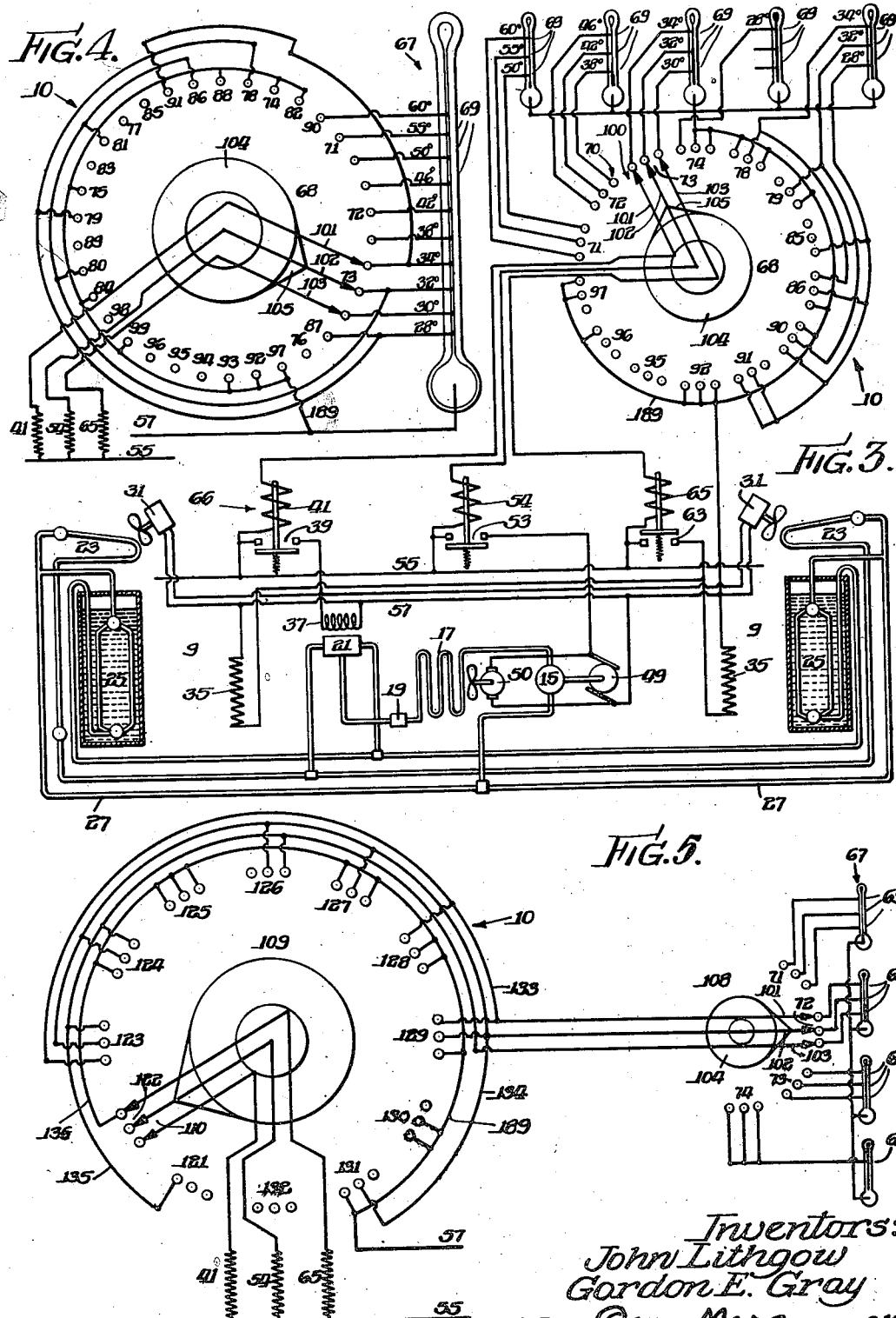

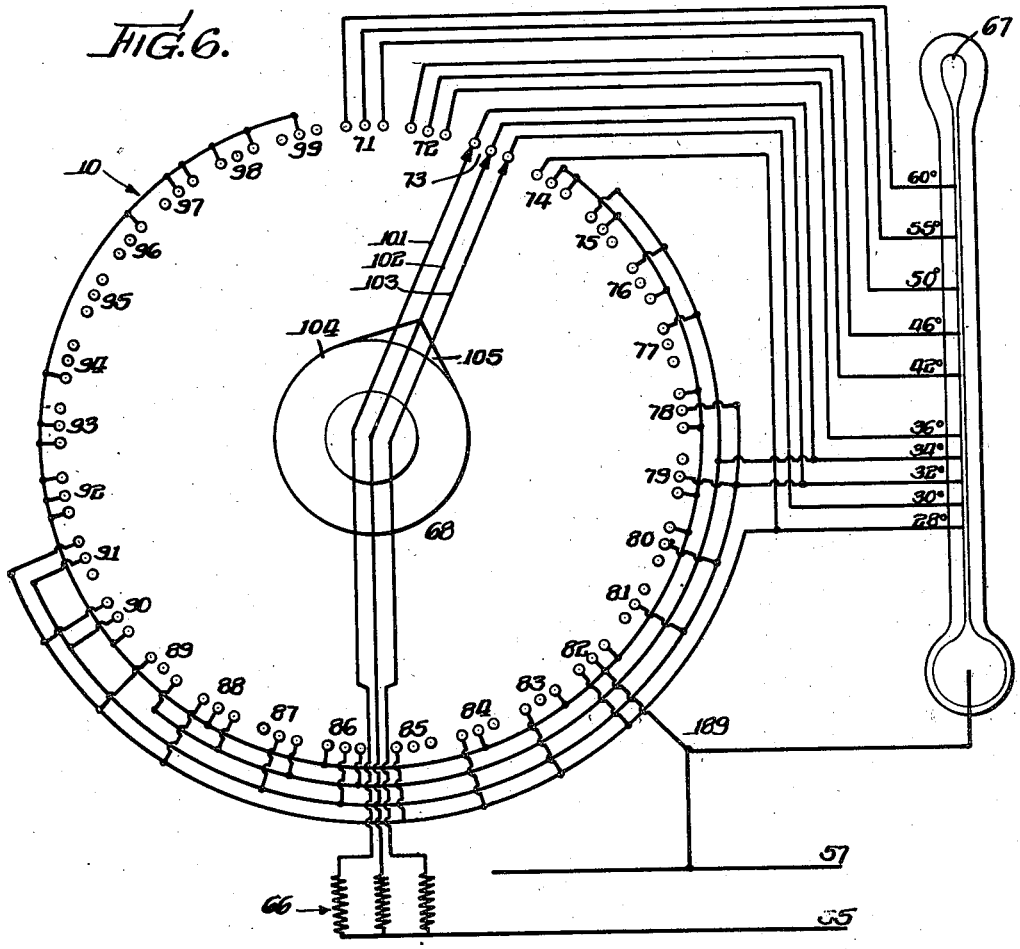

Patented Oct. 29, 1935

2,019,472

UNITED STATES PATENT OFFICE 2,019,472

THERMOSTATIC CONTROL

John Lithgow, Blue Island, and Gordon E. Gray, Chicago, Ill., assignors to North American Car Corporation, Chicago, Ill., a corporation of Illinois Application March 21, 1934, Serial No. 716,584

25 Claims. (Cl. 236—1)

Our invention relates in general to temperature control and has more particular reference to improved means for and method of controlling devices operating in response to temperature conditions prevailing at any control place or station, the invention relating more especially to the control of air tempering apparatus in order to maintain a treated atmosphere within predetermined temperature limits, and having specific application to the automatic control of temperature conditions in moving vehicles.

An important object of the invention is to provide adjustable means for the control apparatus in response to temperature conditions, which means may be adjusted by simply moving a pointer on a scale without reliance upon the skill of an operator.

Another important object is to provide control means for any apparatus, more especially air tempering apparatus, which operates in accordance with temperature conditions prevailing at a control point or station, which control means is positive in operation, rugged and relatively inexpensive, easy to install and service, flexible to afford a variety of control operations, and which is not susceptible to faulty operation due to vibration such as is encountered in vehicles.

Another important object is to provide readily adjustable means for controlling the operation of air tempering apparatus within predetermined temperature range.

Another object of the invention is to provide adjustable means for controlling the operation of any apparatus, more especially air tempering apparatus, adapted to be operated in accordance with temperature fluctuations at a control station wherein the operator may adjust the temperature range within which the control is desired without interfering with the operation or adjustment of the apparatus itself, thus permitting the apparatus to be permanently adjusted for operation by the manufacturer or by an expert service man, and to remain in adjusted condition at all times during use, the only adjustment permitted by the inexpert, casual or vicarious operator, who manipulates the temperature controls from time to time in order to select a desired operating temperature range, being of a master control element or dial, and the adjustment comprising merely the setting of a pointer on a scale showing the temperature range within which a selection can be made.

Another object of the invention is to provide adjustable control means for apparatus, such as air tempering apparatus which is adapted for operation in accordance with temperature conditions prevailing at a control station, which control means is flexible and may be applied to various types of apparatus to be controlled and adapted to a variety of control conditions and which permits the selection of any one of a plurality of temperature ranges within which it is desired to selectively control one or several devices comprising the controlled apparatus.

Another important object of the invention is to provide means for selectively controlling the operation of air tempering apparatus within a predetermined temperature differential at different temperatures within a predetermined range.

Another important object resides in the provision of the novel method of controlling air tempering apparatus as exemplified in the following description.

These and numerous other objects, inherent advantages, and functions of the invention will be apparent as the invention is more fully understood from the following description, which, taken in connection with the accompanying drawings, discloses preferred embodiments of the invention.

Referring to the drawings:

Figure 1 is a sectional view taken longitudinally through a vehicle provided with air tempering apparatus adapted to be controlled in accordance with the teachings of the present invention;

Figure 2 is a view of the underside of the vehicle shown in Figure 1 in order to more fully illustrate the arrangement of parts of the air tempering apparatus;

Figure 3 is a diagrammatic view of the air tempering apparatus shown in Figures 1 and 2, together with an automatic control system embodying the present invention; and Figures 4, 5, 6, and 7 illustrate modified arrangements of a part of the control system illustrated in Figure 3.

To illustrate our invention we have shown on the drawings, apparatus 9, namely, an air tempering system, the operation of which, in accordance with the fluctuation of temperature at a control station, is desirable. The apparatus to be controlled is provided with a readily adjustable control system 10 which embodies and operates in accordance with, the teaching of our present invention. The apparatus to be controlled and the control means are shown mounted in a vehicle, namely a railroad refrigerator car, although it is obvious that the present invention is not necessarily limited to installations in vehicles or to air tempering apparatus but may be applied for the control of any operating device or apparatus whether on a vehicle or installed for stationary operation.

As shown in the drawings, however, we prefer to apply the control means of our present invention for the control of air tempering apparatus carried in a vehicle 11 comprising a preferably insulated housing or casing forming a compartment 12, the atmosphere within which is to be tempered. In the illustrated embodiment, the casing or housing comprises the body of a railroad refrigerator car having wheels 13 and the air tempering apparatus includes a refrigeration system of the compression-evaporation type, in which a suitable refrigerating medium such as ammonia, sulphur, dioxide, ethyl chloride, or other suitable medium may be circulated from a compressor 15, in which the refrigerating medium, in gaseous condition is compressed, through a condenser 17, in which the compressed medium is liquefied, an expansion valve 19, and a selector valve 21 through which the liquefied medium is or may be selectively delivered either to direct cooling coils 23 or to cold storage devices 25 located in any suitable or convenient position in or on the casing in heat exchange relationship with the atmosphere of the compartment 12. The expansion valve 19, in the illustrated system, is preferably of the float controlled type. The coils 23 comprise evaporators or boilers in which the liquefied refrigerant may evaporate in order to absorb heat from and thus refrigerate the surrounding atmosphere while the cold storage devices comprise evaporator coils immersed in brine or other cold storage medium. The gas, produced by the evaporation of the refrigerating medium in the coils of the cold storage device 25 and in the direct-cooling coils 23, is or may be returned, by means of a common return pipe 27 to the suction side of the compressor 15 so that the refrigerating apparatus may function continuously as long as the compressor is driven.

The coils 23 and cold storage devices 25 may be located on the side walls or roof of the compartment, or in any other suitable position in the compartment 12, but are preferably disposed at opposite ends of the compartment behind partitions or bulkheads 14 spaced from the ends of the compartment to provide air conditioning chambers 16 and the bulkheads preferably have openings 18 and 20 respectively near the ceiling and the floor of the compartment to facilitate the circulation of air between the compartment 12 and the cooling chambers 16. The direct-cooling coils 23 and cold storage devices 25 are also preferably arranged for parallel operation, the temperature-regulated control valve 21 being provided to direct the flow of the refrigerating medium either to the refrigerating coils 23 or to the cold storage devices 25.

Any suitable means for driving the compressor may be employed, although we prefer to utilize electrical power supplied from any suitable or convenient source or sources. To this end, we have shown an electric motor 49 drivingly connected with the compressor and together with the compressor mounted on a frame 47 carried beneath the compartment 12. The motor 49 is electrically connected in series with a temperature-controlled switch 53 between bus conductors 55 and 57, which, in turn, are connected with a power source 59 on the vehicle. The power source is or may be a generator carried by the vehicle and driven in any suitable fashion when the vehicle is in transit to deliver electrical power between the bus conductors 55 and 57. When the vehicle is stationary, the generator may be driven in any suitable fashion as by a motor adapted to be energized from an external source of power through a suitable plug-in connection, and the motor and generator 59 may be built as a unit, if desired, or means may be provided for supplying power from an external source directly to the bus conductors 55 and 57, and while any type of electrical power may of course be utilized, we prefer to supply direct current at the conductors 55 and 57.

The switch 53 is normally biased, as by means of a spring, to open position, and has an operating solenoid 54 which when energized, will cause the switch to close and connect the motor between the power busses 55 and 57 and thus place the refrigerating apparatus in operation. A blower and motor 50 for forcing a draft of air to the condenser may also be provided, the motor 50 being connected in parallel with the motor 49 to operate the fan whenever the refrigerating apparatus is in operation.

The selector valve 21 also is normally biased to deliver the refrigerant from the condenser to the cold storage devices 25 but is provided with a solenoid 37 which, when energized, causes the selector valve to deliver the refrigerating medium from the condenser to the direct cooling devices 23. When the direct cooling devices 23 are in operation, the cooling effect of the refrigerating apparatus is imparted, to the atmosphere of the compartment 12, more rapidly than when the refrigerating medium is delivered to the cold storage devices, the purpose of the cold storage devices being to store potential refrigerating energy for gradual liberation during the interval when the maximum heat absorbing capacity of the cooling apparatus is not needed to maintain the temperature of the compartment within a desired limit. One end of the solenoid 37 is connected with the bus conductor 57 and the other end is connected through a switch 39 to the other bus conductor 55. The switch 39 is normally biased as by means of a spring to open position and has an operating solenoid 41, which, when energized, causes the switch 39 to close against its spring bias. When the solenoid 41 is energized, the closure of the switch 39, will cause the solenoid 37 to be energized which in turn, will condition the valve 21 to deliver the refrigerating medium to the direct cooling coil. Conversely when the solenoid 41 is not energized, refrigerating energy, will be delivered to the cold storage device for delayed liberation to the atmosphere of the compartment.

The air-tempering apparatus also includes heaters 35 preferably arranged for parallel operation and disposed at opposite ends of the compartment 12 in heat-exchange relationship with the atmosphere of the compartment, the heaters being preferably disposed on or near the floor of the compartment in position to dissipate heat upwardly by convection in the compartment. One end of each heater is connected with the bus conductor 57, the other ends of the heaters being connected together and through a control switch 63 to the other bus conductor 55. The switch 63 is normally biased as by means of the spring toward closed position, and has a solenoid 65, which causes the switch to open whenever the solenoid is energized.

The air tempering apparatus also may include blowers 31 for assisting in the circulation of air between the compartment 12 and the cooling chamber 16, said blowers being preferably located at the opposite ends of the car near the openings 18 at the upper end of the partitions 14. The blowers are powered by electric motors preferably connected in parallel with the solenoid 37 so that the blowers are placed in operation whenever the direct cooling coils are in operation, that is, when maximum cooling effect is desired. The blowers operate to draw air from the compartment 12 through the openings 20 past the cold storage device and direct cooling coils and return the refrigerated air to the compartment 12 through the upper openings 18.

Although our control system is particularly adapted for the control of railway refrigerator cars, it has broader scope, and we have shown and described the foregoing air tempering apparatus not necessarily by way of limitation, but to furnish a basis for disclosing the operation of the control system which we are about to describe, and it should be understood that the invention is not necessarily limited to the control of air tempering apparatus, but may be applied to any device or devices, the operation of which is to be controlled in accordance with temperature conditions prevailing at a control station. It will be apparent, however, that the control of the apparatus is accomplished by selectively controlling the operation of the solenoids 41, 54, and 65, which therefore comprises controlled devices 66, and our present invention resides in adjustably controlling the devices 66, selectively, in accordance with fluctuating temperatures prevailing at a control station, which, in the illustrated embodiment is the compartment 12, and the device of our present invention contemplates the selective control of the devices 66 whether or not they are switches, as shown, and as far as the broad aspects of our invention are concerned, it is, of course, immaterial whether the devices 39, 53 and 63 controlled by the devices 66 are biased in one direction or another.

In order to control the operation of the devices 66 in accordance with the temperature prevailing at the control station or compartment 12, whereby the heaters and the cooling devices, comprising the controlled apparatus 9, may be selectively operated to add heat to and subtract heat from the atmosphere of the compartment in order to maintain the temperature thereof within predetermined limits, we have provided a control system 10, manually adjustable, without interfering with the operation of the apparatus 9, in order to afford a wide selection of temperature ranges within which it may be desired to maintain the temperature within the compartment 12. To this end we have provided a plurality of thermoresponsive devices 67 preferably comprising contact means 69 adapted to close each at a different predetermined or set temperature prevailing at the control station, said contacts remaining closed each as long as the temperature at the control station is above its set temperature, and remaining open as long as the temperature is below the set temperature. The thermoresponsive means may be of any suitable or preferred form, as for instance, a plurality of individual thermoresponsive switches of any suitable form and set to operate at various temperatures throughout a desired operating range, but we prefer to use one or more thermometers provided with one or more contacts or terminals exposed at various points in the length of the thermometer channel, whereby the expansible medium, in traveling the channel, in response to variations in the temperature to which the thermometer is exposed, will successively engage and make electrical contact with the exposed terminals. These thermoresponsive devices are, or may be mounted, as on a panel 64, within the compartment 12, in heat exchange relation with the atmosphere therein.

An adjustable selector 68, having a plurality of contacts 70, preferably arranged as in sets 71—99, is provided for use in conjunction with the thermoresponsive switches 69 in order to select and connect the desired switches in circuits controlling the operation of the devices 66. Each contact set 71—99 preferably contains contacts equal in number to the number of devices 66, the operation of which it is necessary to control in order to control the operation of the air-tempering apparatus, and it should be understood, of course, that our invention may be applied to apparatus containing any desired number of devices 66 to be controlled. Each of the thermostat contacts is connected with a corresponding contact of the selector 68 and the expansible medium, which is an electrical conductor, such as mercury, is permanently connected with the bus conductor 57 by means of a bus connector 189. As shown in Figure 3, a separate thermometer may be used for each contact set of the selector, the expansible medium of each thermometer being permanently connected with the bus conductor 57. Each thermometer has contacts exposed in the channel thereof and each contact is electrically connected with a corresponding contact of the set with which the thermometer is associated. Alternately, a separate thermometer may be provided for each contact 70, or, as shown in Figure 4, a single thermometer may be used for all of the sets or some of the contacts of each set may be connected to the same thermometer while the other contacts are connected to other thermometers. We prefer to use thermometers having three contacts 69 in addition to the contact by which the expansible medium is connected in the return circuit 189. The thermometers also are made with an expansion chamber at their upper end to permit the thermometers to be made relatively short with relatively wide spacement between the contacts 69 without danger of exploding the thermometers at temperatures higher than their operating range.

The selector switch 68 is also provided with a plurality of shiftable contactors 100, which are preferably ganged together for synchronous movement and to selectively engage with any similarly spaced set of the terminals 70. In the illustrated embodiment the contactors are three in number 101, 102, and 103, and are ganged to engage any three adjacent terminals 70, although other ganging arrangements may, of course, be employed. Each of the contactors 100 is electrically connected by means of a suitable conductor with one end of one of the operating solenoids 41, 54, and 65, contactor 101 being connected with solenoid 41, contactor 102 with solenoid 54, and contactor 103 with solenoid 65. The opposite ends of the solenoids are directly connected with the bus conductor 55 so that the solenoids may be selectively connected in operating circuits extending between the bus conductors 55 and 57, each said circuit including one of the solenoids 66, one of three adjacent terminals 70 of the selector 68 and its associated thermostat, merely by shifting the contactors 100 into engagement with the desired terminal set. While we prefer to form the selector 68 as a rotary switch in which the contacts 70 are arranged circularly while the contactors 100 are mounted for movement with a rotating knob 104 having a pointer 105 to indicate the setting of the knob, the contactors may be arranged to shift in any desired or preferred path.

In the illustrated embodiment, the contacts of the sets 71, 72, and 73 are each connected through thermoresponsive switches 69 with the bus conductor 57. One contact only of the sets 74—85 and two contacts of the sets 86—91 are connected through a thermoresponsive switch with the bus conductor 57, the remaining contacts of said sets being connected either directly to the bus conductor 57 or left open as shown. All of the contacts of the set 92, the first two contacts of the set 93, the first contact of the set 94, none of the contacts of the set 95, the last contact of the set 96, the last two contacts of the set 97, the first and last contacts of the set 98, and the middle contact of the set 99 are or may be directly connected with the bus conductor 57, the remaining contacts of said sets being left open. By manipulating the contactors 100 into engagement with the contact sets 71—99, a variety of control circuits for the solenoids may be established. If the contactors 100 are engaged with the contacts 70, which are connected with thermostats, circuits will be established, each circuit extending from the bus conductor 55 through one of the solenoids 41, 54, and 65, one of the contactors 100, the terminal engaged by said contactor, thence through the thermostat associated with said terminal and the bus connector 89 to the bus conductor 57. Each of said circuits, when the thermostat included therein closes, will energize the solenoid which is included in the circuit, and the solenoid will perform a control operation on the apparatus with which it is associated. When this occurs in a circuit including the solenoid 65, the normally closed switch 63 will open and discontinue the heaters from operation whenever the temperature in the compartment rises above the point at which the heater control thermostat closes. As long as the temperature remains below such point, however, the control circuit remains open with the solenoid remaining de-energized, the switch 63 closed and the heaters in operation. If the temperature continues to rise after the discontinuation of the heaters, the thermostat in the circuit, including the solenoid 54, will eventually close and complete said circuit between the bus conductors 55 and 57, thus energizing the solenoid 54 and closing the switch 53 to place the motor in operation to drive the refrigeration apparatus with the valve 21 conditioned to pass the refrigerating medium to the cold storage, on slow cooling, devices 25. If the temperature continues to rise after the refrigerating apparatus is thus placed in operation, the thermostat in the circuit controlling the solenoid 41 will eventually close and complete said circuit between the bus conductors 55 and 57, thus energizing the solenoid 41 and causing the valve to deliver the refrigerating medium to the direct cooling devices to thus deliver the maximum cooling capacity of the apparatus directly to the chamber 12. Upon a fall in temperature within the compartment 12, the opening of the thermostat contacts in the solenoid control circuits successively cause the switches 39 and 53 to open, thus discontinuing the direct cooling and cold storage devices from operation and the switch 63 eventually to close, and place the heaters again in operation. Thus it will be seen that the air tempering apparatus will be automatically controlled to add or subtract heat from the compartment 12 in order to maintain the temperature of the atmosphere within a range depending upon the adjustment of the thermostat devices associated with the contacts opposite which the contactors 81 are set.

It will be apparent also that, where the control is applied to a device such as the refrigeration system shown, it is desirable to ensure that the thermostat controlling the solenoid 65 is adjusted to close circuit at a temperature below that at which the thermostat controlling the solenoid 54 closes circuit, and that the thermostat controlling the solenoid 54 closes circuit at a temperature below that at which the thermostat controlling the solenoid 41 closes circuit. We accomplish this by ganging the contactors 100 and by connecting the contacts 70 with the thermostat devices in such a way that in any set position of the selector, the contactor 101, which is connected with the solenoid 41, can only engage a contact 70 which is connected with a thermostat closing at a temperature higher than the closing temperature of the thermostats to which the other contactors 102 and 103 are connected when in said set position of the selector, while the contactor 103, which is connected with the solenoid 65, in any set position of the selector, can only engage a contact 70 connected with a thermostat closing at a temperature lower than the closing temperatures of the thermostats to which the other contactors 101 and 102 are connected.

The thermostat devices, connected with the several terminal sets 71, 72, and 73, are calibrated to cause operation of the devices 41, 54 and 65 within different ranges of temperature so that by setting the contactors 100 opposite the proper terminal set of the selector, the device may be set to operate within any desired temperature range within the limits of the control device.

If any of the contactors 100 engage a terminal 70 which is connected directly to the conductor 89 and thence to the bus conductor 57, it is obvious that a circuit will be established which will energize the solenoid included in that circuit continuously and regardless of the temperature within the compartment 12; while if any of the contactors 100 engage a terminal 70 which is not connected either to a thermostat or to the return conductor 89, the solenoid controlled by such contactor will at no time be energized. Thus, the device is selectively operable to provide various control combinations and may be instantly adjusted to provide full automatic temperature control of all the devices 66 and the apparatus controlled thereby, or to provide for the temperature control of any of the devices or any combination of the devices, and to provide for maintaining any of the devices or combinations of the devices either permanently inactive or permanently in operation without temperature control.

It will be noted that when the contactors 100 are engaged with any of the sets 74, 75, 76, and 77, the contactor 101 only is connected with a thermostat device, the remaining contactors being connected either directly to the bus connector 57 or left open as the case may be. With these arrangements, only the switch 39 is operated in accordance with the temperature. When the arrangement of set 74 is applied to control the apparatus 9, the solenoids 65 and 54 are at all times energized, maintaining the switch 63 open, and the switch 53 closed so that heaters remain inoperative, and the refrigeration apparatus is continuously operated no matter what temperature prevails. The solenoid 41, however, is under the control of the thermostat to which the contactor 101 is connected, and the refrigerating medium is delivered to the cold storage device as long as the temperature in the compartment remains below the predetermined value represented by the position of the terminal contact in the channel of the thermometer. Whenever the temperature rises above such a value, the refrigerating medium is, by the operation of the switch 39, delivered to the direct cooling coils 23 in order to apply maximum refrigeration to the compartment.

When the contactors 100 engage the contact set 75, it will be seen that the solenoid 41 will be energized under thermostatic control, while the solenoid 54 will be energized at all times while the solenoid 65 will be always idle. Such an arrangement would not be practical for use in controlling air tempering device as shown in Figure 4, since it would cause operation of the heaters and the cooling system simultaneously. The contact set 75 is therefore omitted from the control system shown in Figure 4, but is shown in Figure 3 to indicate its possible utility in controlling other apparatus than that shown in Figure 4.

When the contactors 100 engage the contact set 76, it will be seen that the solenoid 41 will be energized under thermostatic control while the solenoid 54 is always idle, the solenoid 65 being always energized. Such an arrangement also is impractical for use in controlling air tempering system 9, since the heater and refrigerator would both be permanently disabled with the valve 21 under thermostatic control.

In like manner the contact set 77 would serve no useful purpose if applied to control the device shown in Figure 4, since it would keep the heaters continuously on and the refrigerator continuously off with the valve 21 under thermal control. No useful purpose is served in maintaining the valve 21 under control, in the air tempering system if the refrigerator is inactive to circulate the medium. The control sets 76 and 77 are therefore omitted from the control shown in Figure 4, but are shown in Figure 3 to indicate the possibility of using them for controlling other apparatus than that shown in Figure 3.

When the contactors 100 engage any of the contact sets 78—81, the solenoid 54 is under thermal control, and the solenoids 41 and 65 are either permanently active or permanently disabled. In the set 78, the solenoids 41 and 65 are directly connected with the bus connector 57, and will be constantly energized so that the switch 63 is constantly open and the switch 39 constantly closed. Consequently, the heaters will at all times be inoperative while the selector valve 21 will at all times be set to deliver refrigerating medium to the direct cooling coils. The solenoid 54, however, is under the control of the thermostat to which the contactor 92 is connected, temperature control being applied to the switch 53 which will remain open as long as the temperature in the compartment is such that the thermostat contact is open. When the temperature rises and causes closure of the thermostat switch, the switch 53 will close and set the refrigerating apparatus in operation with refrigeration accomplished by the direct cooling coils only. This is a suitable control for the air conditioning system 9, and is therefore shown in Figure 4 as well as in Figure 3.

In the set 79, solenoid 41 is permanently inactive while the solenoid 65 is always energized, the solenoid 54 being under thermal control. This set also may be used to control the air tempering system 9, since it holds the heaters permanently off with the refrigerator operating under thermal control to deliver the cooling medium to the cold storage devices.

In the set 80, solenoid 41 is permanently active while the solenoid 65 is inactive, solenoid 54 being under thermal control. In the set 81, the solenoids 41 and 65 are permanently disabled, while the solenoid 54 operates under thermal control. Both of these arrangements are undesirable for controlling the apparatus 9, since it would cause the refrigerator to operate at times simultaneously with the heaters. Consequently, these sets are omitted from the control shown in Figure 4.

If the contactors engage any of the contact sets 82—85, temperature control is applied to the solenoid 65 only through the contactor 103, and the solenoid is energized whenever the thermostat contact with which it is connected is closed, thus opening the switch 63 and discontinuing the heaters from operation when the temperature is above that at which the thermostat contact closes. Of these sets 82—85 the set 85 only is adapted to be applied to the apparatus 9, the other sets being undesirable; set 82 because it would continuously energize solenoids 41 and 54, and thus keep the refrigeration apparatus in operation continuously with the medium being delivered to the direct cooling device 23, and at times cause the heaters to operate; the set 83 because it would continuously energize the solenoid 41, the solenoid 54 being continuously inactive and the refrigerator idle, no good end being served by using power to energize the solenoid 41 when the refrigerator is idle; and the set 84 because it would continuously energize the solenoid 54 and operate the refrigerator, the solenoid 41 being inactive with the solenoid 65 controlling the heaters under thermal control, so that the heaters would be at times in operation together with the refrigerator. These sets 82—84 are therefore not shown in the control illustrated in Figure 4. The set 85, however, may be used to control the apparatus 9, since it will keep both solenoids 41 and 54 inactive, thus disabling the refrigerator while keeping the solenoid 65 and the heaters controlled thereby under thermostatic control.

If the contactors 100 engage any of the sets 86—91, two of the devices 66 will be operated automatically under thermostatic control while the third will be either permanently active or disabled, depending on whether the third contact 70 of the set is connected to the return conductor 89 or left open. In sets 86 and 87 the solenoids 41 and 54 are operable under thermostatic control, in sets 88 and 89 the solenoids 41 and 65 are thermostatically controlled, while in sets 90 and 91 the solenoids 54 and 65 are under thermotatic control. In set 86 the solenoid 65 is permanently active, while in set 87 it is inactive. In set 88 the solenoid 54 is permanently active, while in set 89 it is permanently disabled. In set 90 the solenoid 41 is permanently energized, while in set 91 it is inactive.

The sets 86, 90, and 91 are suitable for inclusion in control for the apparatus 9, and are shown in Figure 4 since the set 86 will hold the heaters inactive while permitting the refrigerator and valve 21 to operate under thermal control; the set 90 will permit operation of both heaters and refrigerator to operate under thermal control with the cooling units 23 only in operation; and the set 91 permits thermally controlled operation of the heaters and refrigerator with cooling units 25 only in operation.

The sets 87, 88 and 89 are not suitable to the control of the apparatus 9 and are omitted from Figure 3, since set 87 provides for thermal control of solenoids 41 and 54 with solenoid 64 permanently disabled, while set 88 provides for the thermal control of solenoids 41 and 65 with solenoid 54 in constant operation. Either set applied to the control of apparatus 9 would, at times, cause simultaneous operation of the heaters and refrigerating apparatus. The set 89 causes the solenoids 41 and 65 to operate under thermal control while solenoid 54 is disabled, and if applied to control the apparatus would waste power in the solenoid 41 to keep the valve 21 open to the devices 23 when the solenoid 54 is inactive, and the refrigerator disabled.

Obviously, it is within the scope of the invention to provide a selector to serve given conditions, having any or all of the sets 71—99.

It is also within the invention to connect all of the contacts of a set directly with the bus conductor 57, and in certain instances to omit certain of such direct connections altogether as in the sets 92—99 in order to entirely eliminate the temperature control of the solenoids, and while certain of such arrangements are not desirable in a control for use with the air tempering system illustrated, they are all within the contemplation of our present invention and may be used to advantage under certain conditions.

The sets 92 through 99 illustrate the possibility of connecting one or more of the terminals of each set directly with the bus conductor 57. In the set 92, all of the contacts are connected directly with the return conductor, so that all solenoids are energized continuously. This set may be applied in a control for the apparatus 9 as shown in Figure 4, since it will hold the heaters permanently inactive while causing the refrigerator to operate the direct cooling coils 23 only. In the set 93, the first two contacts are connected directly with the bus conductor 57, while the third contact is isolated. If the contactors 100 are engaged with the contacts of the set 93, the solenoids 41 and 54 will be continuously energized and the solenoid 65 will be inactive at all times. Such a set should not be used to control the apparatus, because it would cause the refrigeration apparatus to be in constant operation with the medium being delivered through the direct cooling coils and at the same time cause the heaters also in continuous operation. The arrangement of the set 94 is such that the solenoid 41 will be continuously energized while the solenoids 54 and 65 will not be energized at any time. This set also is not adapted for use with the apparatus 9, since such use would cause the heaters to be in constant operation with the refrigeration device, and would be inactive with power delivered to the solenoid 41 in order to condition the valve 21 to deliver the refrigerating medium to the direct cooling coils. It would serve no good purpose to so waste power at the solenoid 41 when the refrigerator is inactive. The terminals of set 95 are all isolated so that when the selector is adjusted to this position, none of the solenoids 41, 54 and 65 can be energized at any time, and if the set is applied to control the apparatus 9, the heaters only will be in constant operation. The arrangement of the set 96 is such that the solenoids 41 and 54 are, at all times, inactive while the solenoid 65 is continuously energized. This arrangement may be used in the control for apparatus 9 since, in this position, the heaters are held inactive while the refrigerating apparatus is also held inactive. The arrangement of the contact set 97 is such that the solenoid 41 is inactive while the solenoids 54 and 65 are energized at all times so that the heaters are inactive while the refrigerating apparatus is constantly in operation with the valve 21 delivering the refrigerating medium to the cold storage device.

In the set 98 the first and last terminals are connected to the conductor 89 so that the solenoids 41 and 65 are constantly energized while the solenoid 54 is disabled. If this set was applied to the apparatus 9, the heaters and refrigerator would both be inoperative with the valve 21 set to deliver the refrigerant to the coils 23, and since no good purpose is served in wasting power in the solenoid 41 when the refrigerator is disabled, the set 98 is not shown in Figure 4. In the set 99 the middle contact only is connected to the return conductor so that the solenoid 54 only is energized. This set also is not shown in Figure 4, for if it were applied to the apparatus 9, the heaters and refrigerator would be in constant operation.

In building a selector for the air tempering apparatus shown, it is desirable to use one or more of the contact sets 71, 72, 73, 74, 78, 79, 85, 86, 90, 91, 92, 95, 96, and 97. These sets afford the following selective control arrangements:

| Contact set | Control | | |
| --- | --- | --- | --- |
| | Refrigerator | Cooling devices | Heat |
| 71, 72, 73 | Full thermal control of all units within the range of the respective sets. | | |
| 74 | On | Selective thermal control. | Off. |
| 78 | Thermal control | On direct cooling | Off. |
| 79 | Thermal control | On cold storage | Off. |
| 85 | Off | | Thermal control. |
| 86 | Thermal control | Selective thermal control. | Off. |
| 90 | Thermal control | On direct cooling | Thermal control. |
| 91 | Thermal control | On cold storage | Thermal control. |
| 92 | On | On direct cooling | Off. |
| 95 | Off | | On. |
| 96 | Off | | Off. |
| 97 | On | On cold storage | Off. |

In Figure 5 of the drawings, I have shown the possibility of re-arranging and equally spacing the contacts 70 in order to utilize fewer contacts in providing the set combinations shown in Figure 3, and at the same time to increase the flexibility of thermal control through the possibility of utilizing any three of the terminals instead of any three forming a definite set as in Figure 3. For instance, the contacts affording the three control positions corresponding to sets 71, 72, and 73 in Figure 3, are, in the arrangement shown in Figure 5, no less than seven full thermal control positions, while the first and last two contacts of these sets cooperate with other contacts to give four additional positions affording partial thermal control. It will be noted that any combination provided in the arrangement shown in Figure 3 may also be had by setting the central contactor 102 opposite the proper contact of the arrangement shown in Figure 5, with the contactors 101 and 103 in engagement with the next adjacent contacts. Thus a great flexibility of control is provided with few contacts.

In Figure 6 of the drawings, a selector 108, similar to the selector 68, is used in conjunction with a selector 109. All of the contacts 70 of the selector 108 are connected to thermostats, and the two selectors operate together to provide more flexible operation of the system. The selector 109 in the embodiment shown in Figure 6 is interposed between the selector 108 and the solenoids 41, 54, and 65, the operation of which is to be controlled. The contactors 110 of the selector 109 are connected respectively to the solenoids 41, 54, and 65, while the contacts 70 of its several sets 121—132 are connected to the bus connectors 133, 134, 135, 136, which are in turn connected respectively to the contactors 101, 102, 103 of the switch 108, and to the bus connector 189 and bus conductor 57. The contactors of the selector 108 can be positioned to connect the conductors 133, 134, and 135 to any three of the thermal switches 69 with which it is associated. When the contactors 110 are arranged opposite the contact set 121, the solenoids 41 and 54 will be permanently disabled while the solenoid 65 will be energized under thermal control of the thermal switch to which the contactor 103 is set. The air tempering system will operate with the refrigerator permanently off, and the heaters operating under thermal control. When the contactors 110 engage the contact set 122, the solenoids 41 and 54 will be permanently disabled, while the solenoid 65 will be permanently active, and the air tempering apparatus will be dead. The set 123 affords full thermal control of the heaters, refrigerator and the selector valve 21, all solenoids being energized under the control of the thermal switches to which the contactors 101, 102 and 103 are connected.

The set 124 affords thermal control of the operation of the refrigerator with refrigerant delivered to the direct cooling coils, the heaters being permanently disabled. The set 125 places the refrigerator in continuous operation with refrigerant delivered to the direct cooling coils and heaters permanently disabled. The set 126 affords thermal control of the heaters and the refrigerator with refrigerant delivered to the cold storage devices. The set 127 affords thermal control of the refrigerator with refrigerant delivered to the direct cooling devices 23, and the heaters permanently disabled. The set 128 places the refrigerator in continuous operation with refrigerant delivered under thermal control selectively to the cold storage and direct cooling devices, while the heaters are permanently disabled. The set 129 affords thermal control of the operation of the refrigerator with refrigerant delivered under thermal control selectively to the cold storage and direct cooling devices, while the heaters will be inoperative at all times. The set 130 places the refrigerator in constant operation with the refrigerant delivered to the cold storage device, the heaters being held permanently idle. The set 131 places the refrigerator in operation under thermal control with the refrigerant delivered to the cold storage device, and the heaters being held permanently idle. The set 132 places the heaters in permanent operation while holding the refrigerator inactive.

While the arrangement shown in Figure 6 contains only such sets as are particularly useful in controlling the apparatus 9, it is obvious that it can be made to provide any and all of the set combinations suggested in Figure 3. The contact sets of the selectors 108 and 109 also may be condensed as taught in connection with the device shown in Figure 5. While we have shown in Figure 6 a number of possible set combinations which might be used in controlling the air tempering apparatus 9, it is obvious that several of the set combinations may be eliminated entirely and yet afford a control flexible enough for most practical purposes. For instance, the selector 109 may be built with only the following sets:

| Contact set | Control | | |
|---|---|---|---|
| | Refrigerator | Cooling units | Heater |
| 121 | Off | | Thermal control. |
| 122 | Off | All elements dead | Off. |
| 123 | Full thermal control of all elements. | | |
| 128 | On | Selective thermal control of units | Off. |
| 129 | Thermal control | Selective thermal control of units | Off. |
| 132 | Off | | On. |

It will be noted that the temperature differentials, within the limits of which the apparatus is controlled, are fixed by the thermostats. The use of adjustable thermostats is, of course, within the contemplation of our present invention, but we have shown fixed thermostats comprising thermometers having contacts 69, and our present invention is particularly adapted to give wide flexibility of control using thermal switches fixed, to open and close circuit, each at a predetermined temperature.

We have shown in Figure 7, a system which affords flexibility over a wide range as well as the added advantages of adjustability of the temperature differential, and the ability to cause the control switches to operate at any temperature within the range for which the apparatus is adapted without regard to the temperature at which any of the other control switches operate. In certain cases, it is preferable to positively prevent one or more of the switches from operating at a temperature above or below any other switch as is the case in the control of the air tempering apparatus 9. Consequently, in the control shown in Figures 3, 4, 5, and 6, the control device is arranged so that the switch 39 may close only at a temperature above that at which the switch 53 closes, while the switch 63 may close only at a temperature below that at which the switch 63 opens, regardless of the adjustment of the selector. Of course, the thermal switch may be otherwise connected to the contacts in the devices shown in Figures 3, 4, 5, and 6, in order to provide greater flexibility of control. However, when maximum flexibility is desired, we may provide a separately operable selector for each of the devices to be controlled. To this end, we have shown a selector switch 133 for the solenoid 41, a selector switch 135 for the solenoid 54, and a selector 137 for the solenoid 65. These switches each have a plurality of contacts 140—152 arranged preferably circularly and a shiftable arm is provided in position to successively engage the contacts, the shiftable arm of the switch 133 being connected to the solenoid 41, the arm of the switch 135 being connected to the solenoid 54, and the arm of the switch 137 being connected to the solenoid 65.

The corresponding contacts 140 of the switches 133, 135 and 137 are electrically connected together and connected to the bus conductor 57. The corresponding contacts 141—151 of the switches are likewise electrically connected together in sets, and each set is connected to a thermal switch 69, which is shown as a contact exposed in the channel of a thermometer, the expansible medium within the thermometer being connected to the bus conductor 59 by means of the return conductor 89. Obviously any number of thermostat contacts may be employed, and the number of selector switches may be multiplied in order to afford control of additional solenoid devices 66. If the arm of the switch 133 is set opposite the contact 140, the solenoid 4 will be continuously energized, and if applied to control the apparatus 9, will hold the switch 39 closed, so that the valve 21 will be conditioned to direct the refrigerating medium to the direct cooling coils. Likewise, if the arm of the switch 135 is set opposite its contact 140, the solenoid 54 will be constantly energized, and the switch 53 will remain closed, thus maintaining the refrigerating apparatus continuously in operation. Similarly, if the arm of the switch 137 is set opposite its contact 140, the solenoid 65 will be constantly energized, and the switch 63 will remain continuously open, and the heaters will be inoperative.

In like manner, if the arms of the switches 133, 135 and 137 are set opposite the open contact 152, the solenoids 41, 54, and 65 will be inactive, and the switches 39 and 53 will remain continuously open, thus disabling the refrigerating apparatus while the switch 63 will remain closed, thus maintaining the heaters in continuous operation.

If the arms of the switches 133, 135, and 137 are set opposite any of the contacts 141—151, the solenoids 41, 54 and 65 will be energized, and the switches 39 and 53 will be closed, and the switch 63 will open when the thermal switch, with which said selector contact is associated, closes. Consequently, as will be obvious, the selector switches 133, 135, and 137 may be adjusted to cause the control switches 39, 53, and 63 to operate at any selected temperature within the range provided by the apparatus.

It is thought that the invention, its numerous attendant advantages and inherent functions will be understood from the foregoing description, and it is obvious that numerous changes may be made in the form, construction and arrangement of the parts without departing from the spirit or scope of the invention, or sacrificing its attendant advantages, the forms herein shown being only preferred arrangements for the purpose of illustrating the invention.

What we claim as new and desire to secure by Letters Patent of the United States is:

1. A control system for controlling a plurality of electrically operable devices in response to variable conditions prevailing in a fluid medium at the remote control station comprising the combination, with a plurality of circuit control elements operable in response to variation in the condition of said medium at the control station and disposed in position to be influenced by said medium, of a plurality of manually adjustable elements connectible at will with any of said circuit control elements, and means operatively connecting each of said electrically operable devices with one of the manually adjustable elements whereby said devices may be selectively placed under the control of any of said circuit control elements.

2. A control system as set forth in claim 1 wherein said circuit control elements comprise thermometer means embodying a thermometric medium adapted to expand and travel a predetermined path under the influence of increasing temperature, said thermometric medium being an electrical conductor and said thermometer means having electrodes disposed in the path of said expanding medium whereby said medium may form electrical contact with each electrode at a predetermined temperature.

3. A control system as set forth in claim 1 wherein said circuit control elements comprise thermometer means embodying a channel, an expansible current carrying medium adapted to expand and travel in said channel under the influence of increasing temperature, and an electrode exposed in said channel and adapted to make electrical contact with said expansible medium when the same is exposed to temperatures in excess of a predetermined value.

4. A control system as set forth in claim 1 wherein the electrical device comprises a solenoid and an associated control element shiftable by the solenoid when the same is energized to perform a controlling operation.

5. A control system as set forth in claim 1 including means forming apparatus actuated from a prime mover and wherein the electrical control device is operatively associated for controlling the delivery of actuating power from the prime mover to said apparatus.

6. A control system as set forth in claim 1 including means forming refrigerating apparatus wherein a refrigerating medium is delivered to a refrigerating element in response to the actuation of a prime mover and wherein the electrical control device is operatively associated with said refrigerating apparatus to control the delivery of the refrigerating medium to the refrigerating element.

7. A control system as set forth in claim 1 including means forming refrigerating apparatus comprising a plurality of refrigerating elements, a prime mover, means to deliver a refrigerating medium to said elements in response to the actuation of the prime mover, and operable means to selectively control the delivery of the refrigerating medium to said elements, wherein said electrical control device is operatively associated for controlling said operable means.

8. A control system as set forth in claim 1 including means forming refrigerating apparatus wherein a refrigerating medium is delivered to a refrigerating element in response to the actuation of a prime mover and wherein the electrical control device is operatively associated with said prime mover for controlling the operation of the same.

9. A control system as set forth in claim 1 including means forming a device which, when operated, is adapted to produce heat and wherein the electrical control device is operatively associated with said heat producing means in order to control the operation of the same.

10. A control system as set forth in claim 1 including additional circuit-forming means to which said manually adjustable element is connectible at will, said circuit-forming means being directly connected with a power source whereby the electrical control device may be permanently energized independently of said circuit control elements.

11. A control system as set forth in claim 1 including additional means to which said manually adjustable element is connectible in order to leave the circuit, in which the electrical control device is connected, permanently open so that the same is at all times inactive regardless of the operation of the circuit control elements.

12. A control system as set forth in claim 1 including additional means to which said manually adjustable element may be selectively connected in order either to connect the electrical control device in series with the power source or to leave the circuit permanently open regardless of the circuit control elements.

13. A control system for controlling operable apparatus in response to variable temperature conditions prevailing in a medium at a remote control station comprising the combination with a plurality of thermostats each adapted to control an electric circuit at a predetermined temperature and each disposed in heat exchange relationship with the medium at the control station, of a plurality of manually adjustable elements selectively connectible at will with any of said thermostats, an electrical control device electrically connected with each of said adjustable elements and adapted to perform a control operation upon the operable apparatus when energized, and circuit-forming means connecting each control device with a source of power and connecting said thermostats with said power source whereby each control device may be selectively connected in a series circuit including the power source and any desired one of said thermostats.

14. A control system as set forth in claim 13 including air tempering apparatus having heat adding means for delivering heat to the atmosphere being tempered and heat subtracting means for removing heat from the air being tempered wherein one of said control devices is operatively associated with the air tempering apparatus to control the operation of the heat adding means while another of said control devices is operatively associated with the air tempering apparatus to control the operation of the air subtracting means.

15. A control system as set forth in claim 13, including air tempering apparatus having heat exchange means including heat-adding means and heat-subtracting means for delivering heat to and taking heat from the atmosphere being tempered, and control means operatively associated with at least one of said heat exchange devices for varying the rate at which it performs its heat-exchanging function, wherein said electrical control devices are operatively associated with the air tempering apparatus, one to control the operation of said heat-adding means, another to control the operation of the heat-subtracting means and still another to control the operation of said control means.

16. A control system as set forth in claim 13 including air tempering apparatus having heat-exchange means in heat-exchanging relationship with the atmosphere being tempered, and control means operatively associated with said heat exchange means for varying the rate at which it performs its heat-exchanging function wherein said electrical control devices are operatively associated with the air tempering apparatus, one to control the operation of said heat-exchange means and another to control the operation of said control means.

17. A control system as set forth in claim 1 wherein said manually adjustable elements are ganged together for movement in unison and to engage predetermined sets of said circuit control elements.

18. A control system as set forth in claim 1 including a second manually adjustable device interposed in series between said electrical control devices and the manually adjustable elements which are connectible with the thermostats, said second manually adjustable device comprising adjustable elements connected each with one of the electrical control devices and connectible at will in any of a plurality of circuits including various combinations of the manually adjustable elements which are selectively connected at will with the circuit control elements.

19. A control system for controlling a plurality of electrically operable devices in response to variable temperature conditions prevailing in a medium at a remote control station comprising the combination of a plurality of thermostats each disposed in heat exchange relationship with the medium at the control station, of a plurality of manually adjustable elements connectible at will with any of the thermostats, means operatively connecting each of said electrically operable devices with one of said manually adjustable elements whereby the devices may be selectively placed under the control of any of said thermostats, said means comprising manually adjustable means comprising adjustable elements connected each with one of the electrical control devices and connectible at will with any desired combination of the manually adjustable elements, and means whereby the adjustable elements of the manually adjustable means may be arranged to connect any of the electrical control devices directly with the power source.

20. A control system for controlling a plurality of electrically operable devices in response to variable temperature conditions prevailing in a medium at a remote control station comprising the combination of a plurality of thermostats each disposed in heat exchange relationship with the medium at the control station, of a plurality of manually adjustable elements connectible at will with any of the thermostats, means operatively connecting each of said electrically operable devices with one of said manually adjustable elements whereby the devices may be selectively placed under the control of any of said thermostats, said means comprising manually adjustable means comprising adjustable elements connected each with one of the electrical control devices and connectible at will with any desired combination of the manually adjustable elements, and means whereby the adjustable elements of the manually adjustable means may be arranged to connect any of the electrical control devices in an open circuit.

21. A control system for controlling a plurality of electrically operable devices in response to variable conditions prevailing in a medium at a remote control station comprising the combination, with a plurality of circuit control elements operable in response to variation in the condition of said medium disposed in position to be influenced by the medium at the control station, of a plurality of adjustable elements connectible at will with any of said circuit control elements and operatively associated each with one of said electrical operable devices whereby to connect the same with a source of power under the control of any of said circuit control elements, and means with which each of said adjustable elements may be selectively associated whereby the same may be connected directly with said source of power.

22. A control system for controlling a plurality of electrically operable devices in response to variable conditions prevailing in a medium at a remote control station comprising the combination, with a plurality of circuit control elements operable in response to variation in the condition of said medium and disposed in position to be influenced by the medium at the control station, of a plurality of adjustable elements connectible at will with any of said thermostats and operatively associated each with one of said electrically operable devices whereby to connect the same with a source of power under the control of any of said circuit control elements, and means with which each of said adjustable elements may be selectively associated whereby the same may be connected directly with said source of power or may remain entirely disconnected from said power source.

23. A control system as set forth in claim 21, wherein the adjustable elements are ganged for adjustment in unison and interconnected so that, in each adjusted position, the elements will cooperate each with one of a selected set of said circuit control elements.

24. A control system as set forth in claim 21, wherein the adjustable elements are ganged for adjustment in unison so that, in each adjusted position, the elements each will connect its associated electrically operable device with the power source under the control of one of a selected set of said circuit control elements or directly.

25. A control system as set forth in claim 21, wherein the adjustable elements are ganged for adjustment in unison so that, in each adjusted position, the elements each will connect its associated electrically operable device with the power source, under the control of one of a selected set of said circuit control elements or directly, or will connect its associated electrically operable device in open circuit.

JOHN LITHGOW.
GORDON E. GRAY.